(No Model.)

A. F. DELAFIELD.
Galvanic Battery.

No. 237,830. Patented Feb. 15, 1881.

WITNESSES:
Donn P. Twitchell
C. Sedgwick

INVENTOR:
A. F. Delafield
BY Munn & Co
ATTORNEYS.

UNITED STATES PATENT OFFICE.

A. FLOYD DELAFIELD, OF NEW YORK, N. Y.

GALVANIC BATTERY.

SPECIFICATION forming part of Letters Patent No. 237,830, dated February 15, 1881.

Application filed December 18, 1880. (No model.)

*To all whom it may concern:*

Be it known that I, A. FLOYD DELAFIELD, of the city, county, and State of New York, have invented a new and useful Improvement in Galvanic Batteries, of which the following is a specification.

The object of my invention is to provide for increasing the activity of galvanic batteries at will and continuously or for short periods of time.

The nature of the invention consists in producing a more or less rapid circulation of the solution in contact with the elements by mechanical means, operated by hand or by a motor, which I accomplish practically by fitting the negative element upon a shaft for revolution between the zinc plates, and for increasing the effect the revolving disk is made in spiral form, whereby it acts to create a circulation of solution in the cell.

Figure 1:
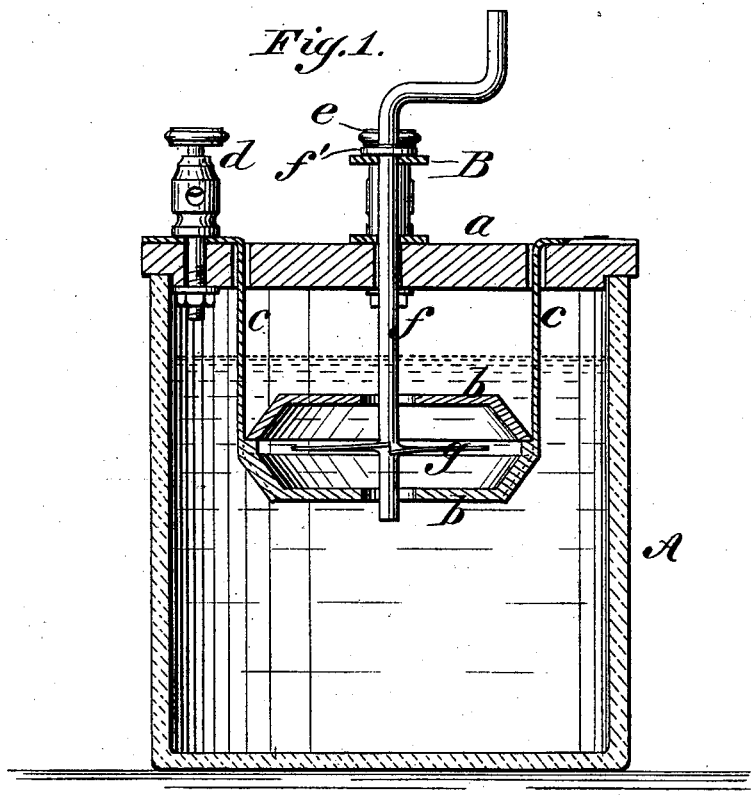
Figure 2:
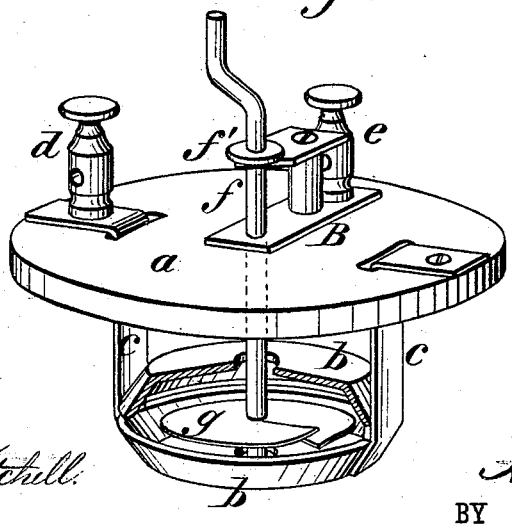

In the accompanying drawings, Figure 1 is a vertical section of a battery-cell containing my improved devices; and Fig. 2 is a perspective view, partially in section, of the cover and other parts of the battery.

Similar letters of reference indicate corresponding parts.

A is the cell, provided with cover $a$, of wood or other suitable material. $b\,b$ are disks of zinc, centrally apertured, and suspended apart a short distance from cover $a$ by metallic arms $c\,c$, to one of which a binding-post, $d$, is connected.

B is a metallic bracket, fixed on cover $a$ and provided with a binding-post, $e$.

$f$ is a spindle, sustained on bracket B in a vertical position by a collar, so that the spindle is free to turn, and with its lower end extending through the apertures of the zincs $b$. On the lower end of spindle $f$, between the disks $b$, is fixed a disk, $g$, of platinum or other suitable material. This may a flat disk simply, or made in spiral form, as shown. The spindle $f$ is shown as formed at its upper end with a crank-handle, whereby it can be turned by hand to revolve the disk $g$ in its own plane, and, if desired, the spindle can be connected with a spring or other motor when a continuous revolution at uniform speed is desired. By the revolution of the element $g$ the solution in the cell is agitated and put in circulation. The spiral form of the disk has the effect to draw the liquid through the central apertures of the zinc disks $b$, and thus force a rapid circulation. The effect is to increase the activity of the battery, according to the speed of revolution, and thus the power of battery can be regulated within certain limits at the will of the operator.

It is evident that the construction can be varied. For instance, the revolution can be in a vertical plane, and both elements can be fitted for revolution instead of one. A carbon disk of suitable thickness can be used, the same being fitted to revolve between two centrally-apertured flat disks of zinc.

The spindle and other brass work in contact with the solution is to be protected by a coating of solder.

Having thus described my invention, I claim as new and desire to secure by Letters Patent—

1. In galvanic batteries, the element $g$, of spiral or other form, sustained on a spindle that is fitted for revolution, combined with the apertured disks $b$, substantially as shown and described.

2. The combination, in a galvanic battery, of fixed apertured disks, constituting the positive element, and a disk-shaped negative element, fitted for revolution between the positive elements, substantially as shown and described, and for the purposes set forth.

A. FLOYD DELAFIELD.

Witnesses:
 GEO. D. WALKER,
 C. SEDGWICK.